United States Patent
Hong et al.

(10) Patent No.: US 6,754,041 B2
(45) Date of Patent: Jun. 22, 2004

(54) DISC DRIVE COVER PORTION THERMALLY COUPLED TO A PREAMPLIFIER

(75) Inventors: Yi Ren Hong, Singapore (SG); Poh Ly Lim, Singapore (SG); Kelly Mei Kee Lim, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 51 days.

(21) Appl. No.: 10/267,439

(22) Filed: Oct. 8, 2002

(65) Prior Publication Data

US 2003/0227710 A1 Dec. 11, 2003

Related U.S. Application Data

(60) Provisional application No. 60/386,926, filed on Jun. 7, 2002.

(51) Int. Cl.[7] .............................................. G11B 33/14
(52) U.S. Cl. .................................................. 360/97.02
(58) Field of Search ...................................... 360/97.02

(56) References Cited

U.S. PATENT DOCUMENTS

| | | | |
|---|---|---|---|
| 5,282,099 A | 1/1994 | Kawagoe et al. | 360/97.01 |
| 5,587,855 A | 12/1996 | Kim | 360/97.02 |
| 5,751,514 A | 5/1998 | Hyde et al. | 360/97.01 |
| 5,892,655 A | 4/1999 | Grouell | 361/690 |
| 5,969,445 A | 10/1999 | Horiuchi et al. | 310/64 |
| 6,025,973 A | 2/2000 | Mizoshita et al. | 360/98.08 |
| 6,320,723 B1 | 11/2001 | Bernett | 360/97.02 |
| 6,337,782 B1 | 1/2002 | Guerin et al. | 360/256.1 |
| 6,351,344 B1 | 2/2002 | Krum et al. | 360/97.01 |
| 6,603,659 B2 * | 8/2003 | Kim et al. | 361/690 |

* cited by examiner

Primary Examiner—A. J. Heinz
(74) Attorney, Agent, or Firm—Merchant & Gould P.C.

(57) ABSTRACT

A data storage disc rotatably mounted on a spin or spindle motor fastened to a base plate. An actuator assembly is fastened or otherwise coupled to base plate adjacent to data storage disc. The actuator assembly positions a transducer or head over a data surface of the disc. A cover above the base plate encloses the disc, the spin motor, and the actuator assembly between the cover and the base plate. A pass-through connector is positioned above and coupled to the base plate for routing electrical leads from the transducer through a preamplifier mounted above the pass through the pass-through connector to a printed circuited board located below an underside of the base plate. The cover has a surface thermally coupled to the preamplifier to conduct heat from the preamplifier.

22 Claims, 3 Drawing Sheets

DISC DRIVE COVER PORTION THERMALLY COUPLED TO A PREAMPLIFIER

RELATED APPLICATIONS

This application claims the benefit of priority of U.S. provisional application Serial No. 60/386,926, filed Jun. 7, 2002.

FIELD OF THE INVENTION

This application relates generally to disc drives and more particularly to a disc drive cover configured to act as a heat sink for an electronic circuit within the disc drive.

BACKGROUND OF THE INVENTION

Current disc drive designs utilize a preamplifier to amplify weak read signals produced by magnetoresistive read elements in the read/write heads. The preamplifier needs to be located near the heads to minimize signal loss in the leads between the heads and the preamplifier. Consequently, the preamplifier is mounted on the top or side of the actuator assembly that carries the read/write heads. Now, with drives getting very small, but carrying much greater data capacities, there is little room on an actuator assembly to mount the preamplifier. Therefore, the preamplifier has been moved to the flex bracket on the pass-through connector leading from the interior of the drive to the disc drive servo control printed circuit board typically mounted to the bottom of the disc drive. The preamplifier operation generates heat. Removal of this heat has previously not been a substantial problem because, with an actuator mounting of the preamplifier, the heat is dissipated by close contact with the actuator body. However, with the mounting of the preamplifier on the pass-through connector, reliance is made on the flow of air within the disc drive to remove this heat. With the focus on smaller and smaller drives with greater and greater data capacities, the capacity of the internal air flow to remove heat becomes critical.

Accordingly there is a need for a better, more efficient means to draw heat away from internal disc drive components such as preamplifiers and their printed circuit boards. The present invention provides a solution to this and other problems, and offers other advantages over the prior art.

SUMMARY OF THE INVENTION

The invention includes a disc drive that has a drive cover configured to act as a heat sink for electronic components within the disc drive on which the cover is placed. The electronic components may include a pre-amplifier and a printed circuit board, and the cover is formed to provide a heat transfer coupling between the electronic components and the cover, thus dissipating excess heat out of the closed environment of the disc drive through the cover.

One embodiment of the present invention is incorporated into a disc drive having a data storage disc rotatably mounted on a spin or spindle motor fastened to a base plate. An actuator assembly is fastened or otherwise coupled to base plate adjacent to the data storage disc. The actuator assembly positions a transducer or head over a data surface of the disc. A cover above the base plate encloses the disc, the spin motor, and the actuator assembly between the cover and the base plate. A pass-through connector is positioned in and closes an opening through the base plate. This connector routes electrical signals from the transducer through a preamplifier mounted above the pass-through connector to a printed circuited board located below an underside of the base plate. The cover has a surface thermally coupled to the preamplifier to conduct heat from the preamplifier. In one embodiment, the cover comprises a protrusion, which may be a dent defined by the cover, that has a lower surface that is in contact with the preamplifier. Another embodiment has the connector resiliently pushing the preamplifier against the dent in the cover such that the heat generated in the preamplifier is dissipated.

These and various other features as well as advantages which characterize the present invention will be apparent from a reading of the following detailed description and a review of the associated drawings.

DETAILED DESCRIPTION

Figure 1:
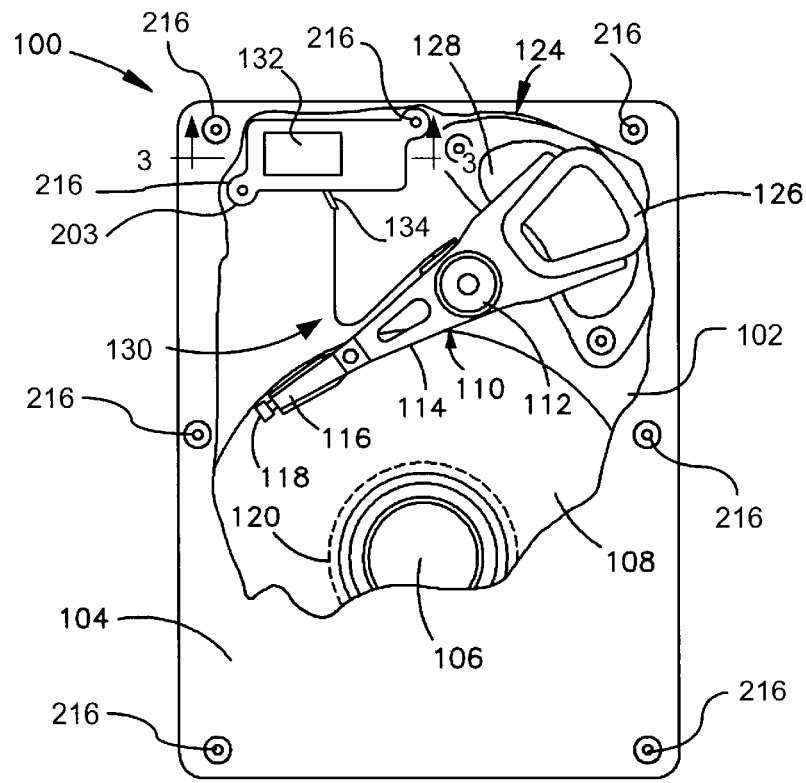
FIG. 1 is a top plan view of a disc drive in accordance with one embodiment of the present invention showing primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components beneath the cover 104 include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend toward the discs 108, with one or more flexures 116 extending from each of the actuator arms 114. Mounted at the distal end of each of the flexures 116 is a transducer or head 118 which typically includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

The spindle motor 106 typically is de-energized when the disc drive 100 is not in use for extended periods of time. The heads 118 are typically moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flexible ribbon printed circuit 130 provides the requisite electrical connection paths for the actuator assembly 110 while allowing pivotal movement of the actuator assembly 110 during operation. The flexible ribbon printed circuit 130 is fastened to a flex bracket 134 on a pass-through connector 203. The flexible ribbon printed circuit 130 electrically connects the heads 118 through a preamplifier 132 fastened to the pass-through connector 203 to a disc drive servo control printed circuit board (PCB) 213, fastened to the underside of the base plate 102. The printed circuit board 213 is not shown in FIG. 1 but is shown in the sectional view of FIGS. 3, 4 and 5. The preamplifier chip 132 includes circuitry for controlling the write currents applied to the heads 118 during a write operation and for amplifying read signals generated by the heads 118 during a read operation.

Figure 2:
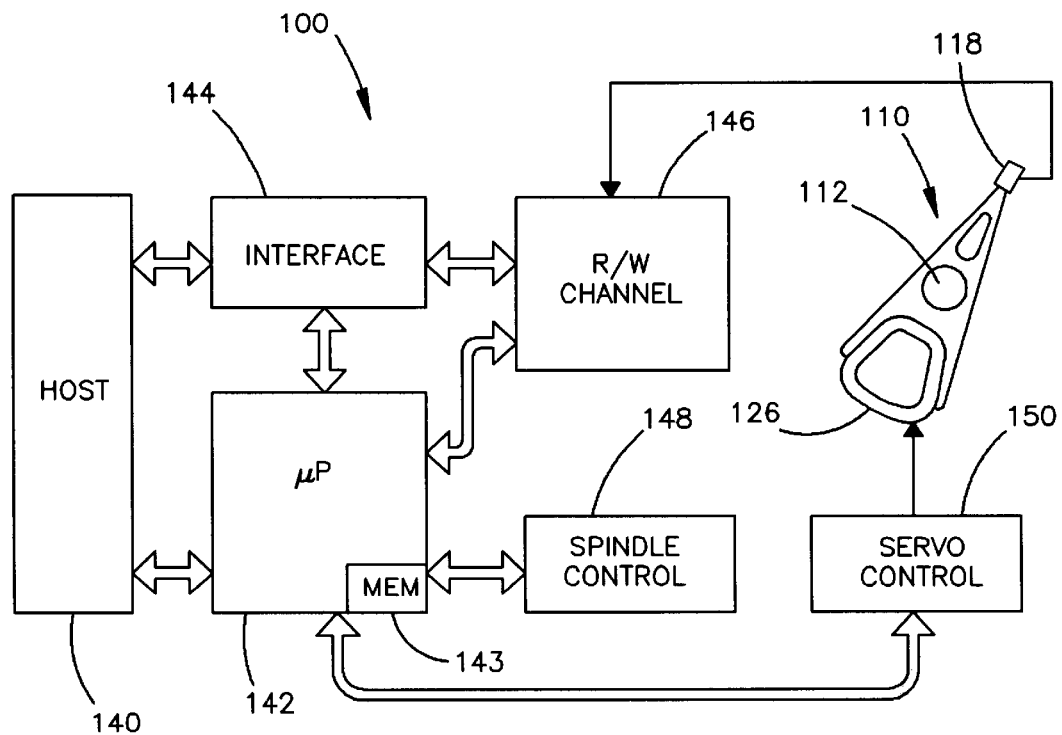
FIG. 2 is a functional block diagram of the disc drive shown in FIG. 1.

A functional block diagram of the disc drive 100 of FIG. 1 is shown in FIG. 2. The disc drive 100 is operably connected to a host computer 140 in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142.

The discs 108 are rotated at a constant high speed by a spindle motor control circuit 148, which typically electrically commutates the spindle motor 106 (FIG. 1) through the use of back electromotive force (BEMF) sensing. During a seek operation, wherein the actuator 110 moves the heads 118 between tracks, the position of the heads 118 is controlled through the application of current to the coil 126 of the voice coil motor 124. A servo control circuit 150 provides such control. During a seek operation the microprocessor 142 receives information regarding the velocity of the head 118, and uses that information in conjunction with a velocity profile stored in memory 143 to communicate with the servo control circuit 150, which will apply a controlled amount of current to the voice coil motor coil 126, thereby causing the actuator assembly 110 to be pivoted on the bearing assembly 112.

Data is transferred between the host computer 140 or other external device and the disc drive 100 by way of an interface 144, which typically includes a buffer to facilitate high speed data transfer between the host computer 140 or other device and the disc drive 100. Data to be written to the disc drive 100 is thus passed from the host computer 140 to the interface 144 and then to a read/write channel 146, which encodes and serializes the data and provides the requisite write current signals to the heads 118. To retrieve data that has been previously stored on the discs in the disc drive 100, read signals are generated by the heads 118 and provided to the read/write channel 146, which performs decoding and error detection and correction operations and outputs the retrieved data to the interface 144 for subsequent transfer to the host computer 140 or other device. The read/write channel 146 includes the preamplifier 132, which, in the present invention, is located on top of the pass-through connector 203 and is attached to the flexible ribbon printed circuit 130 attached to the flex bracket 134.

Figure 3:
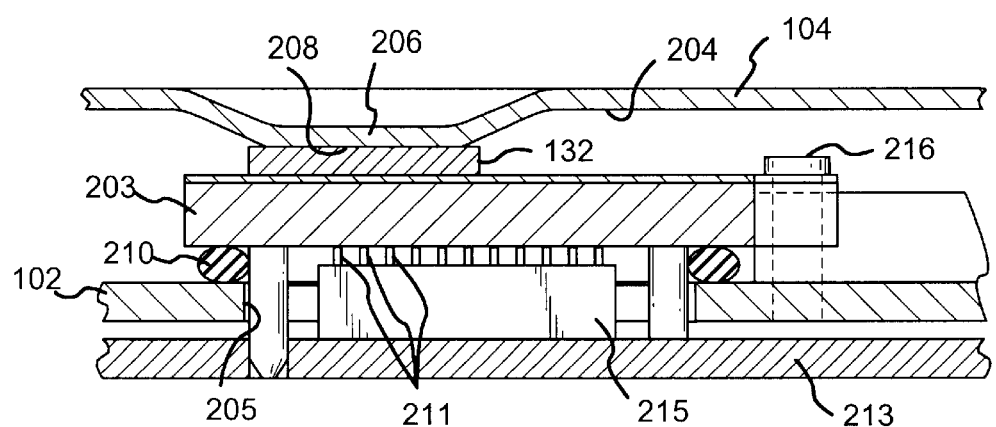
FIG. 3 is a partial cross sectional of the disc drive in FIG. 1 taken along the lines 3—3 in FIG. 1.

One embodiment of the present invention is most clearly shown in the partial cross sectional view of FIG. 3. The pass-through connector 203 closes an opening 205 in the base plate 102. The pass-through connector 203 has a plurality of contact pins 211 that vertically extend through the opening 205 and fit into complementary sockets in a connector 215 mounted on the printed circuit board 213 fastened to the underside of the base plate 102. An oval resilient seal 210, preferably a rubber O-ring, surrounds the opening 205 and provides an airtight barrier between the base plate 102 and the connector 203. Mounted on top of the connector 203 is the flex bracket 134 terminating the flexible ribbon printed circuit 130 from the heads 118. Soldered to the pins 211 and the flexible ribbon 130 printed circuit 130 is the preamplifier 132 such that the preamplifier 132, flex ribbon 130, flex bracket 134 and connector 203 form one rigid connector assembly. In the embodiment shown in FIG. 3, the connector assembly is fastened vertically to the base plate 102 with two screws 216.

The cover 104 above the base plate 102 encloses the disc 108, the spin motor 106, and the actuator assembly 110 between the cover 104 and the base plate 102. The cover 104 has a lower surface 204 that is thermally coupled to the preamplifier 132 to conduct heat from the preamplifier. In this embodiment, the cover 104 has a protrusion 206, which may be formed by a dent in the generally flat plate of the cover 104 or a thickened portion of the cover 104 over the preamplifier 132. The lower surface 208 of the protrusion 206 is thermally coupled to the preamplifier 132 and may be configured to be in physical contact with the top of preamplifier 132, or coupled to the upper surface of the preamplifier by a thermally conductive paste, polymer, or other conductive material.

Figure 4:
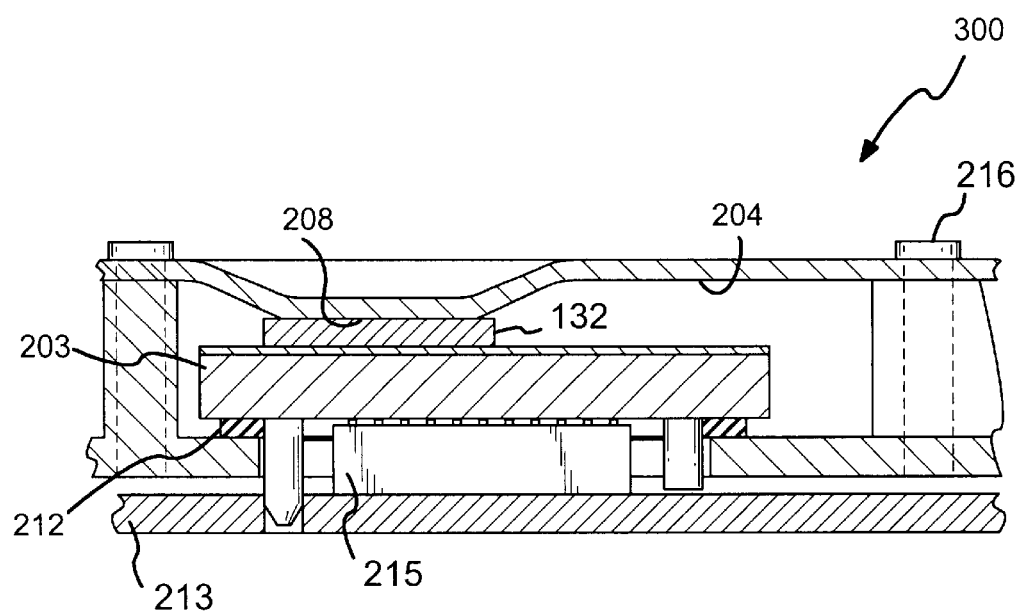
FIG. 4 is a partial cross sectional view as in FIG. 3 of an alternate embodiment of the present invention.

In the embodiment shown in FIG. 3, the cover 104 is shaped such that when it is fastened to the base pate 102, the dent or protrusion 206 presses against the top of the preamplifier 132 or against a thermally conductive material which in turn contacts the preamplifier 132. Alternatively, the connector 203 may be resiliently biased upward against the cover 104 or against the protrusion 206. One embodiment 300 of this alternative arrangement is shown in FIG. 4. As in the first embodiment described with reference to FIG. 3, the pass-through connector 203 has pins 211 that pass signals from the preamplifier 132 through the opening 205 to the printed circuit board 213 fastened to the underside of the base plate 102. However, in this alternative embodiment, the body of the connector 203 in the opening 205 is free to move vertically in the opening 205 and the connector is not screwed to the base plate 102 as in the embodiment shown in FIG. 3. In addition, the resilient seal 212 around the opening 205 is compressed, pushing upward on the connector 203. The cover 104 is screwed to the base plate 102 with fasteners 216, preferably on opposite sides of the connector 203, such that the dent or protrusion 206 presses against the preamplifier 132 mounted on the top of the connector 203. In turn, the seal 212 is compressed, providing a biasing force upward on the connector 203 to maintain the contact, or coupling, between the cover 104 and the preamplifier 132. This seal 212, as is seal 210, is preferably made of rubber or other polymer having the requisite elasticity.

In the embodiment 300 of FIG. 4, the connector pressure between preamplifier chip 132 and cover 104 is provided by elastic deformation of the seal 212, the rubber being used as spring element. In such an embodiment, it is easy for the designer to control the magnitude of the contact force between the preamplifier chip 132 and the surface 208 of the cover lower surface 204, in order to ensure that the contact force is not be too high to damage the parts or to create particles inside the disc drive.

Figure 5:
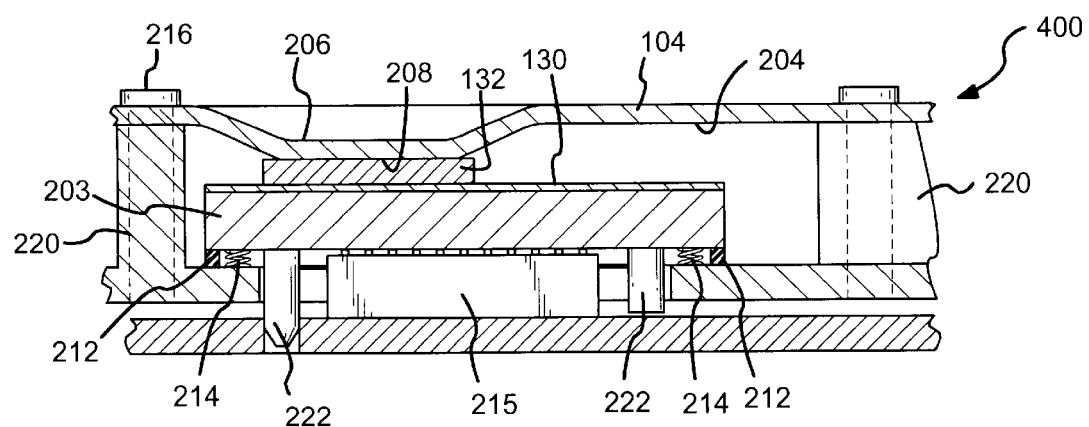
FIG. 5 shows a biasing system of another embodiment of the present invention.

Alternatively, a spring arrangement 214 may be used in conjunction with the seal 212 as shown in the embodiment 400 in FIG. 5. In order to ensure adequate thermal coupling of the preamplifier chip 132 through direct contact or other thermal coupling between the preamplifier 132 and the cover 104, one or more springs 214 in conjunction with the rubber seal such as 212 may be utilized. In either the embodiment of FIG. 4 or that of FIG. 5, the connector 203 is not fastened to the base plate 102 but is free to rise against the underside surface 204 of the cover 104, and specifically against the protrusion 206. In these embodiments, the connector 203 may be guided by posts portions 220 of the base plate 102 on opposite sides of or around the connector 203. Alternatively, movement of the connector 203 may be guided by guide pins 222 on the connector 203 which slide in holes in the base plate 102.

Figures 6, 7:
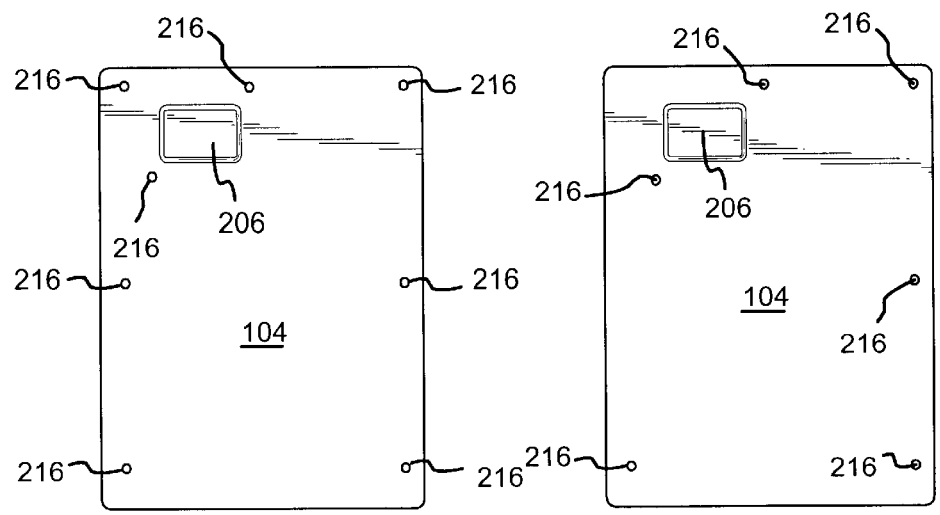
FIG. 6 is a plan view of the disc drive shown in FIG. 1 showing the layout of fasteners securing the cover to the base plate.
FIG. 7 is a plan view of the disc drive as in FIG. 6 showing an alternate layout of fasteners securing the cover to the base plate.

In each of the embodiments shown in FIGS. 3, 4, and 5, the cover 104 must be fastened to the base plate 102. In the embodiment shown in FIG. 3, the cover 104 is fastened to the base plate 102 in a conventional manner with 6 peripheral screws located around the outer edge of the base plate 102 as above in FIG. 1. Alternatively, in the embodiment of FIG. 4, two additional screws through the cover 104, for a total of 8, are utilized as shown in FIG. 6. In this embodiment, the screws that normally would fasten the connector 203 to the base plate instead also pass through the cover into the base plate 102. Another alternate, more preferred arrangement, is shown in FIG. 7. In this arrangement, only 6 screws are utilized to fasten both the cover 104 to the base plate 102 and press the connector 203 to the base plate 102, as would be the case with the basic design shown in FIG. 3. This alternative eliminates 2 screws entirely and can be utilized with either the design shown in FIG. 3 or the design shown in FIGS. 4 or 5. This embodiment positions the protrusion 206 diametrically between two of the fasteners 216. This diametrical position preferably distributes bias forces exerted by the cover on the preamplifier 203 symmetrically.

In the embodiment of FIG. 7, six fasteners are shown, all six being distributed around the periphery of cover 202, with two of the six screws being secured diagonally with respect to the orientation of the protrusion 206, and hence the preamplifier 132 is diametrically between these two screws. In the embodiment of FIG. 7, it is preferred to move the two screws (originally used to fix only the top cover) very close to the preamplifier 132. This arrangement may also be utilized with the arrangement shown in FIG. 3, with slight modification such that these two screws also pass through the connector 203 to fasten both the connector and the cover to the base plate 102. The portions of the base 102 on either side of the connector 203 are preferably shaped as posts or ridges similar to that shown in FIG. 4, such that the underside 204 of the cover 104 abuts the connector 203. Alternatively the cover may have dents on opposite sides of the protrusion 206 that touch the connector 203, and holes through the dents to accommodate the screws 216.

The present invention may be viewed as a disc drive that, in each of the above described embodiments, has enhanced heat dissipation capability for the preamplifier circuit or chip in the read/write channel 146. In addition, a preferred configuration eliminates the need for two fasteners and therefore also reduces manufacturing material costs and simplifies the manufacturing process over prior drive configurations.

Alternatively, the present invention may be viewed as a disc drive (such as 100) that includes a data storage disc (such as 108) rotatably mounted on a spin motor (such as 106) fastened to a base plate (such as 102). An actuator assembly (such as 110) is coupled to the base plate (such as 102) adjacent the data storage disc (such as 108). The actuator assembly (such as 110) positions a transducer (such as 118) over a data surface of the disc (such as 108). A cover (such as 104) above the base plate (such as 102) encloses the disc, the spin motor, and the actuator assembly between the cover and the base plate. A pass though connector (such as 203) closes an opening (such as 205) through the base plate (such as 102) and routes electrical signals from the transducer (such as 118) to a printed circuit board (such as 213) that is fastened to an underside of the base plate (such as 102) through a preamplifier (such as 132) mounted to the pass-through connector (such as 203). The cover (such as 104) has a surface portion (such as 204) thermally coupled to the preamplifier (such as 132) to conduct heat from the preamplifier.

The surface portion (such as 204) of the cover (such as 104) preferably is an underside protrusion (such as 206) having a lower surface (such as 208) that is thermally coupled to an upper surface of the preamplifier (such as 132). The lower surface (such as 208) of the protrusion (such as 206) is preferably in contact with the preamplifier (such as 132). The pass-through connector (such as 203) has leads (such as 211) for electrically coupling signals from the preamplifier (such as 132) to the printed circuit board (such as 213).

The surface portion (such as 208) of the cover coupled to the preamplifier (such as 132) is preferably diametrically between two spaced apart fasteners (such as 216) attaching the cover (such as 104) to the base plate (such as 102). In one embodiment, the two fasteners (such as 216) pass through the pass-through connector (such as 203) into the base plate (such as 102). The preamplifier (such as 132) may be biased against the cover (such as 104) by a resilient seal member (such as 210 or 212) between the base plate (such as 102) and the pass-through connector (such as 203). Further, the preamplifier (such as 132) may be is mounted on a flex cable (such as 130) on top of the pass-through connector (such as 203).

The invention may also be viewed as a disc drive (such as 100) having a base plate (such as 102), a cover (such as 104) on the base plate (such as 102) enclosing components of the disc drive including a preamplifier (such as 132) located above a pass-through connector (such as 203), and a dent (such as 206) in the cover (such as 104) defining a portion (such as 208) of the cover (such as 104) coupling the cover (such as 104) to the preamplifier (such as 132) for thermally conducting heat away from the preamplifier. The preamplifier (such as 132) may be biased toward the dent (such as 206) in the cover (such as 104). The disc drive (such as 100) may further include a plurality of fasteners (such as 216) around a peripheral portion of the cover (such as 104) fastening the cover to the base plate (such as 102), wherein the dent (such as 206) is diametrically between two of the fasteners (such as 216). The two fasteners (such as 216) may pass through the pass-through connector (such as 203) to fasten the connector (such as 203) to the base plate (such as 102). The dent (such as 206) may have a shape complementary to an upper surface shape of the preamplifier (such as 132).

The present invention may alternatively be viewed as a disc drive (such as 100) having a data storage disc (such as 108) rotatably mounted on a spin motor (such as 106)

fastened to a base plate (such as 102), an actuator assembly (such as 110) coupled to the base plate (such as 102) adjacent the data storage disc (such as 108), the actuator assembly (such as 110) positioning a transducer (such as 118) over a data surface of the disc (such as 108), a pass though connector (such as 203) coupled to base plate (such as 102) routing electrical leads (such as 211) from the transducer (such as 118) through a preamplifier (such as 132) mounted above the pass-through connector (such as 203) to a printed circuit board (such as 213) fastened to an underside of the base plate (such as 102), a cover (such as 104) over the base plate (such as 102) enclosing the disc (such as 108), the spin motor (such as 106), and the actuator assembly (such as 110) between the cover and the base plate, and means (such as 206 and 208) on the cover for conducting heat from the preamplifier (such as 132). The means on the cover (such as 104) may include a portion of the cover (such as 104) forming an inward protrusion (such as 206) having a lower surface (such as 208) thermally coupled to an upper surface of the preamplifier (such as 132). The lower surface (such as 208) of the protrusion (such as 206) preferably is in contact with the preamplifier (such as 132) and preferably has a surface shape complementary to a shape of the upper surface of the preamplifier (such as 132).

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the dent forming the protrusion 206 preferably has a lower surface shape that is complementary to, e.g. approximately the same as, the top surface of the preamplifier 132 in order to provide as much surface contact as possible, and hence provide maximum heat transfer from the preamplifier 132 to the cover 104. Other protrusion shapes may also be utilized that are chosen to optimize the heat transfer during drive operation. A thermally conductive paste may also be applied to the interface between the protrusion 206 and the preamplifier to enhance the thermal connection. In addition, other shapes of the cover 104 and biasing members 210 (FIG. 3), 212 (FIG. 4), and 214 (FIG. 5) may be utilized that are within the scope of the claims. The configuration of connector 203 is merely exemplary, with contact pins 211 protruding into a complementary socket connector 215 fastened to the printed circuit board 213. It is to be understood that the pins and sockets could be reversed, and configured differently than that shown. In addition, the protrusion or dent 206 may be minimal if the connector 203 is raised so as to directly contact the underside 204 of the cover 104. Numerous other changes may be made which will readily suggest themselves to those skilled in the art and which are encompassed in the spirit and broad scope of the invention disclosed and as defined in the appended claims.

What is claimed is:

1. A disc drive comprising:
   a data storage disc rotatably mounted on a spin motor fastened to a base plate;
   an actuator assembly coupled to the base plate adjacent the data storage disc, the actuator assembly configured to position a transducer over a data surface of the disc;
   a cover above the base plate enclosing the disc, the spin motor, and the actuator assembly between the cover and the base plate; and
   a pass though connector closing an opening through the base plate and configured to route electrical signals from the transducer to a printed circuit board fastened to an underside of the base plate through a preamplifier mounted to the pass-through connector, wherein the cover has a surface portion thermally coupled to the preamplifier to conduct heat from the preamplifier.

2. The disc drive of claim 1 wherein the surface portion of the cover is an underside protrusion having a lower surface that is thermally coupled to an upper surface of the preamplifier.

3. The disc drive of claim 2 wherein the lower surface of the protrusion is in contact with the preamplifier.

4. The disc drive of claim 2 wherein the preamplifier is biased into contact with the cover.

5. The disc drive of claim 4 wherein a resilient seal member between the base plate and the pass-through connector biases the preamplifier against the cover.

6. The disc drive of claim 3 wherein the preamplifier is biased into contact with the cover.

7. The disc drive of claim 1 wherein the pass-through connector has leads for electrically coupling signals from the preamplifier to the printed circuit board.

8. The disc drive of claim 1 wherein the surface portion of the cover coupled to the preamplifier is diametrically between two spaced apart fasteners attaching the cover to the base plate.

9. The disc drive of claim 8 wherein the two fasteners pass through the pass-through connector into the base plate.

10. The disc drive of claim 8 wherein the preamplifier is mounted on a flex cable on top of the pass-through connector.

11. The disc drive of claim 1 wherein the preamplifier is biased into contact with the cover.

12. A disc drive comprising:
    a base plate;
    a cover on the base plate enclosing components of the disc drive including a preamplifier located above a pass-through connector; and
    a dent in the cover defining a portion of the cover coupling the cover to the preamplifier for thermally conducting heat away from the preamplifier.

13. The disc drive of claim 12 wherein the preamplifier is biased toward the dent in the cover.

14. The disc drive of claim 12 further comprising a plurality of fasteners around a perimeter portion of the cover fastening the cover to the base plate, wherein the dent is diametrically between two of the fasteners.

15. The disc drive of claim 14 wherein the two fasteners pass through the pass-through connector to fasten the connector to the base plate.

16. The disc drive of claim 12 wherein the dent has a shape complementary to an upper surface shape of the preamplifier.

17. A disc drive having a data storage disc rotatably mounted on a spin motor fastened to a base plate, an actuator assembly coupled to the base plate adjacent the data storage disc, the actuator assembly configured to position a transducer over a data surface of the disc, a pass though connector coupled to base plate configured to route electrical leads from the transducer through a preamplifier mounted above the pass-through connector to a printed circuit board fastened to an underside of the base plate, the disc drive comprising:
    a cover over the base plate enclosing the disc, the spin motor, and the actuator assembly between the cover and the base plate; and
    means on the cover for conducting heat from the preamplifier.

18. The disc drive of claim 17 wherein the means on the cover comprises a portion of the cover forming an inward protrusion having a lower surface thermally coupled to an upper surface of the preamplifier.

19. The disc drive of claim 18 wherein the lower surface of the protrusion is in contact with the preamplifier.

20. The disc drive of claim 18 wherein the lower surface of the protrusion has a surface shape complementary to a shape of the upper surface of the preamplifier.

21. The disc drive of claim 18 further comprising two fasteners securing the cover to the base plate, wherein the inward protrusion is diametrically between the two fasteners.

22. The disc drive of claim 21 wherein the two fasteners pass through the pass-through connector into the base plate.

* * * * *